(No Model.)
E. C. PHILLIPS.
ATTACHMENT FOR VELOCIPEDE PUMPS.
No. 595,547. Patented Dec. 14, 1897.
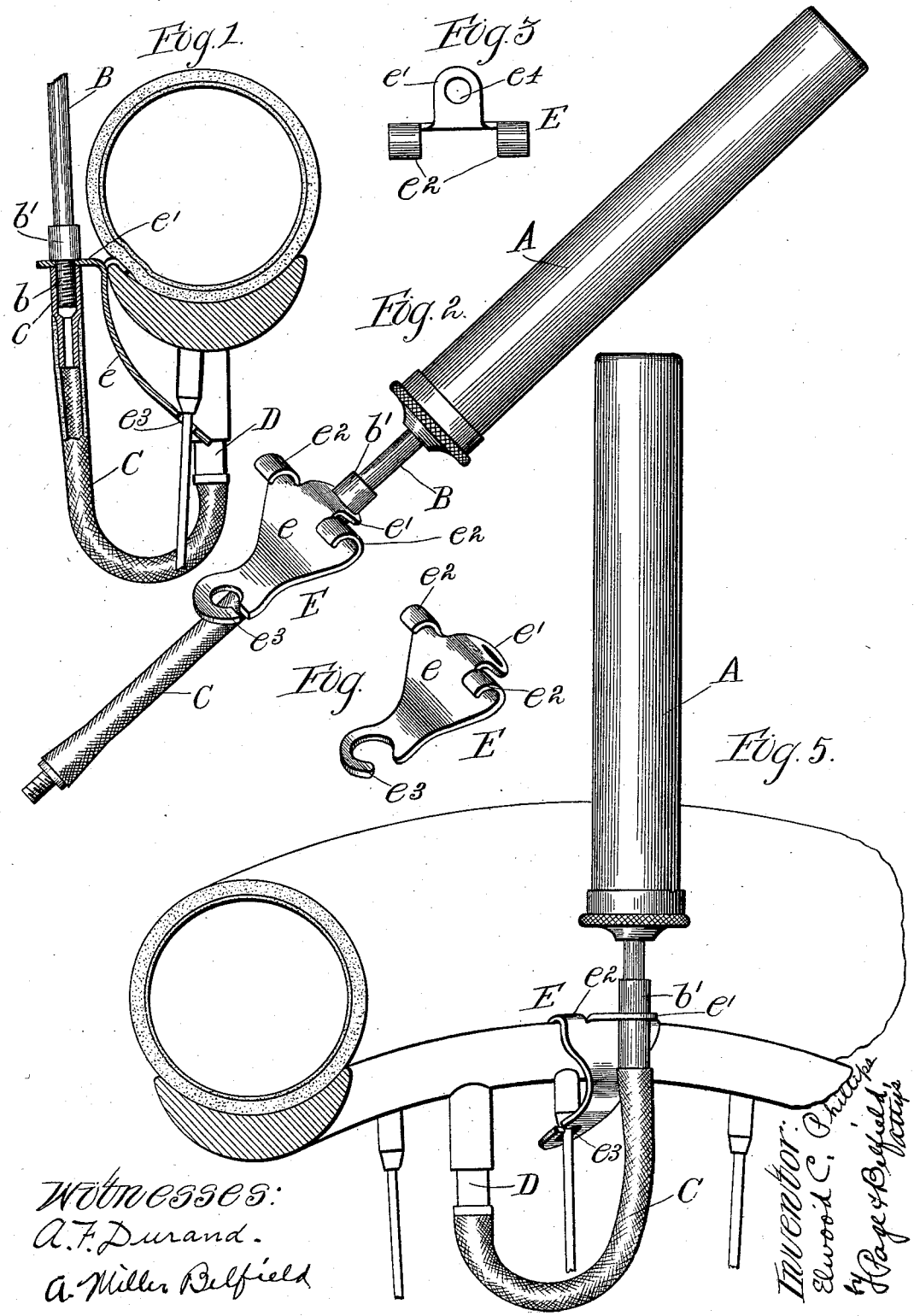
Witnesses:
A. F. Durand.
A. Miller Belfield
Inventor:
Elwood C. Phillips
by Page & Belfield
his attys

UNITED STATES PATENT OFFICE.

ELWOOD C. PHILLIPS, OF CHICAGO, ILLINOIS, ASSIGNOR OF ONE-HALF TO GILES A. STANLEY, OF SAME PLACE.

ATTACHMENT FOR VELOCIPEDE-PUMPS.

SPECIFICATION forming part of Letters Patent No. 595,547, dated December 14, 1897.

Application filed August 8, 1896. Serial No. 602,166. (No model.)

*To all whom it may concern:*

Be it known that I, ELWOOD C. PHILLIPS, a citizen of the United States, residing at Chicago, in the county of Cook and State of Illinois, have invented a certain new and useful Improvement in Attachments for Velocipede-Pumps, of which the following is a specification.

A generally-adopted construction of portable air-pump for inflating pneumatic tires of velocipedes, such as bicycles, comprises a small reciprocating barrel, a hollow piston, through which the discharge takes place, and a flexible tube which is temporarily connected with the outer end of the piston and adapted for connection with the nipple of a pneumatic tire. In some pumps, however, the flexible tube is temporarily connected with a nozzle on the barrel, and in such case the piston is reciprocated. Where the barrel of the pump is reciprocated, as in the first-mentioned instance, the operator employs one hand for manipulating the barrel and uses the other hand as a seat or abutment for a stop or rest on the piston, while in the second-mentioned instance the barrel must be held by one hand and the piston operated by the other hand. In both instances the operation is difficult and tiresome and one requiring the exercise of strength, which all riders do not possess, it being observed that the impact incident to the forward stroke of either the barrel or the piston, as the case may be, must be met and sustained by one hand of the operator.

The object of my invention is to overcome such difficulties, and to such end I provide a simple, economical, and convenient construction of pump attachment which can be readily connected with and disconnected from the wheel-rim, so as to permit the wheel to sustain the successive impacts, and as a matter of further improvement I adapt the attachment for temporary connection with an air-pump, so that it can be detached when not in use and conveniently packed away in the usual tool-bag along with the pump, as hereinafter more fully set forth.

In the accompanying drawings, Figure 1 illustrates, partly in section and partly in elevation, an air-pump and pneumatic tire with the attachment temporarily secured upon the piston and applied to the wheel-rim, the pump-barrel being omitted and the piston being in part broken away for convenience of illustration. Fig. 2 shows the pump and attachment in perspective. Fig. 3 is an end view of the attachment. Fig. 4 shows the attachment in perspective with the hook portion or eye adapted to engage the nipple on a tire. Fig. 5 illustrates in elevation a portion of a pneumatic tire and wheel-rim with the pump and attachment applied.

The pump herein shown is of ordinary construction and comprises the reciprocating barrel A and a hollow piston B, having an externally-threaded end $b$, upon which the threaded socket $c$ at one end of a flexible air-conducting tube C can be screwed. The opposite end of this flexible tube is understood to be adapted for connection with the nipple or valve-casing D of a pneumatic tire in any ordinary or desired way.

The attachment E is in the nature of a clip having a main or body portion $e$, provided with a lug $e'$, adapted to connect with the pump device, and with lugs or claws $e^2\ e^2$, adapted to clasp upon the edge portion of the wheel-rim. The attachment is also adapted to engage one of the wheel-spokes or the tire-nipple, as preferred, and to such end it is provided with an open eye or hook $e^3$, which in Fig. 4 is large enough to engage the usual tire-nipple, while in the other figures it is shown somewhat contracted, so as to more particularly adapt it for engaging a spoke.

The attachment may be formed of suitably-bent wire; but as a preferred construction and matter of further improvement it is formed by a plate, which can be economically apertured and struck up into proper ultimate shape. The clasps or claws $e^2$ project laterally from one end of the plate and are formed and bent so that they can be inserted between the tire and edge of the wheel-rim and clasped upon the latter, as in Figs. 1 and 5, and they are also set sufficiently apart to provide a steady bearing. The plate is also so bent that when it is brought into position to engage the wheel-rim, as hereinbefore described, it will extend under the rim, so as to form a brace against side-to-side swinging motion on the part of the pump and also so as to permit the eye $e^3$ to receive one of the spokes or the nipple, as the case may be, and thereby further steady and position the device.

The lug $e'$ is desirably arranged between the claws $e^2$ and projects laterally from the plate in a direction reverse to that in which the claws extend therefrom, so as to permit the pump which connects with such lug or holder to be maintained alongside the tire during operation. As best shown in Fig. 1, the threaded end $b$ of the piston can be temporarily inserted through an aperture $e^4$ in the lug $e'$, and the socket $c$ of the flexible tube C can then be screwed upon the said threaded end of the piston and tightened up against the lug $e'$ to an extent to clamp the latter against a shoulder $b'$ on the piston.

When the attachment is connected with the pump and applied to the wheel-rim, as illustrated by Figs. 1 and 5, the barrel can be worked for the purpose of pumping air into the tire, and during such operation the wheel-rim will provide an abutment which will take up the impacts incident to the working of the pump and thereby greatly lighten and lessen the labor, while the portion of the plate which extends under the wheel-rim will brace the attachment, so as to oppose the tendency on the part of the pump to swing from side to side as a result of its being engaged by the attachment at a point to one side of the point of engagement of the latter with the wheel-rim and thereby entirely relieve the hand from all necessity of holding the pump against such swinging motion.

Where the pump is of the kind in which the piston is operated, the attachment can be connected with a threaded nozzle arranged on the barrel and corresponding with the threaded end $b$ of the piston.

The device is exceedingly cheap and simple and can be attached to any of the portable pumps for velocipedes now commonly found on the market, and when desired it can be formed as a fixture on the pump.

What I claim as my invention is—

1. An attachment for velocipede-pumps comprising a pump-supporting portion adapted to form an abutment in opposition to the forward end thrust of the pump; and a clip or clamping portion arranged to engage the wheel and bind thereon so as to oppose both the longitudinal movement and side swinging motion of the pump when the latter and said attachment are in use.

2. An attachment for velocipede-pumps having a bearing portion adapted to engage the wheel-rim; a pump-supporting portion forming an abutment in opposition to the forward end thrust of the pump when the pump and attachment are in use; and a portion formed to engage a spoke of the wheel or the nipple of the tire.

3. The combination with a pump for inflating velocipede-tires, of an attachment therefor comprising a pump-supporting portion engaging the nozzle end of the pump and forming an abutment in opposition to the forward end thrust of the pump, and a clip or clamping portion arranged to engage the wheel and bind thereon so as to oppose both the longitudinal movement and the side swing of the pump when in use.

4. A pump attachment for the purpose set forth comprising a plate provided with claws for engaging the wheel-rim, an eye for engaging a spoke or the tire-nipple, and an aperture for receiving a threaded end of the piston or a threaded nozzle on the pump-barrel.

5. An attachment for velocipede-pumps comprising a pump-supporting portion adapted to form an abutment in opposition to the forward end thrust of the pump; a bearing portion adapted to engage the outer edge of the wheel-rim, so as to oppose the longitudinal movement on the part of the pump; and a portion engaging the wheel-rim at a point within its outer edge, and forming a brace against the tendency on the part of the pump to swing from side to side, as set forth.

6. The combination with a pump for inflating pneumatic tires on wheels, of an attachment comprising a clip adapted for engaging the wheel-rim and forming a support for the pump, said clip being formed to engage and bear upon the wheel-rim and to extend under the same.

ELWOOD C. PHILLIPS.

Witnesses:
A. F. DURAND,
A. MILLER BELFIELD.